Aug. 10, 1926.
J. B. CALLAHAN
FIBROUS PRODUCT
Filed Nov. 23, 1922
1,595,448
2 Sheets-Sheet 1
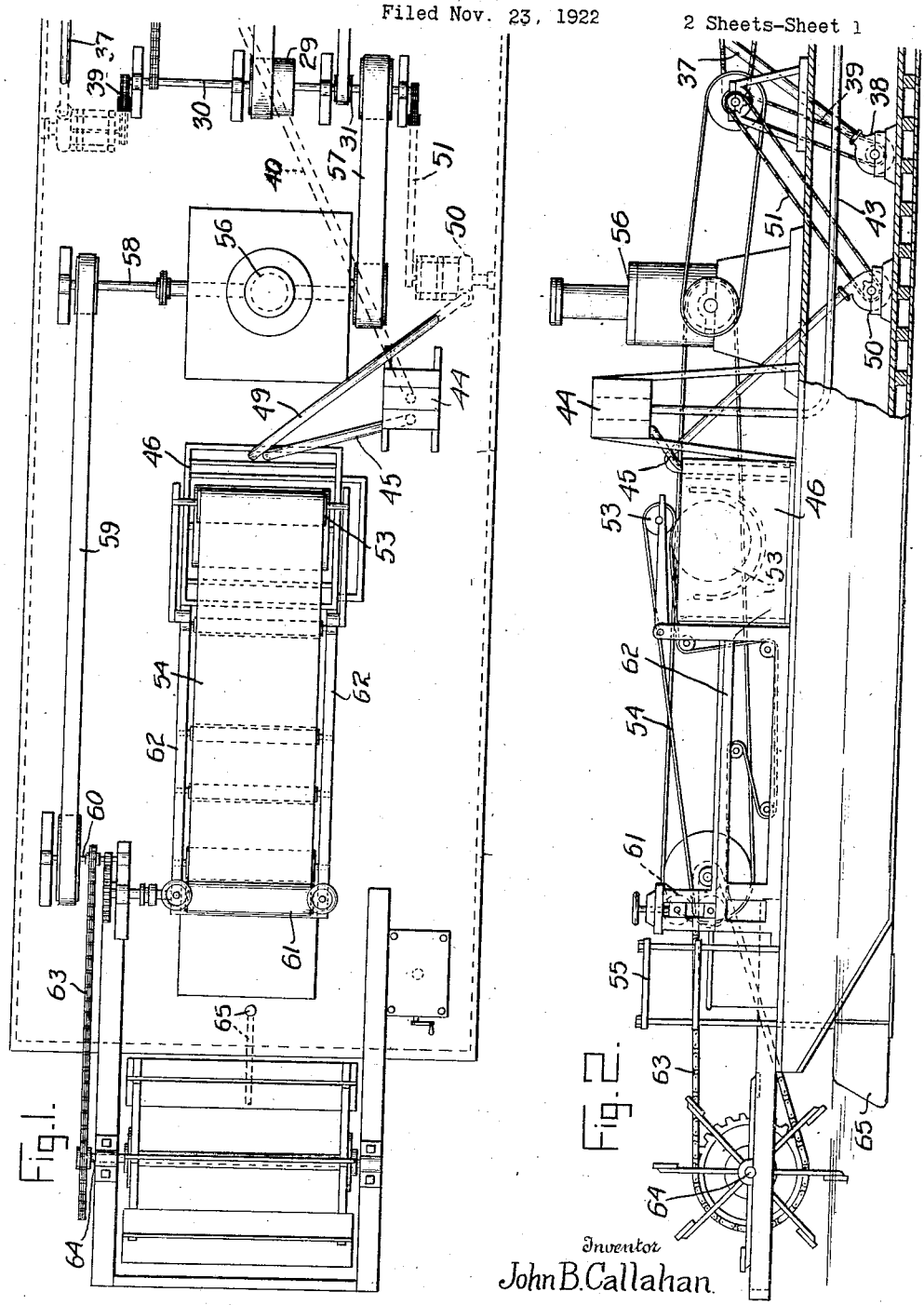
Inventor
John B. Callahan
By
Attorney

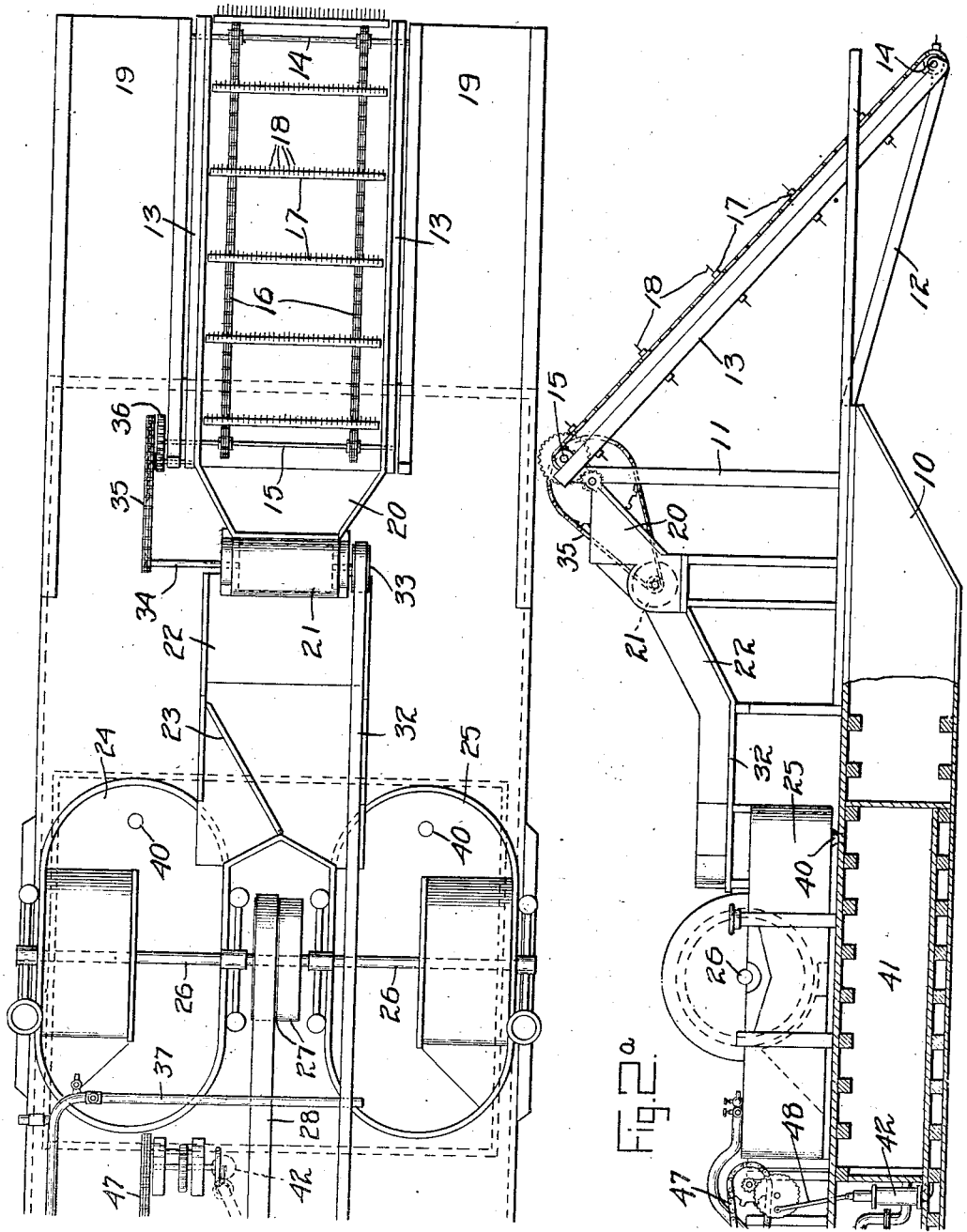

Patented Aug. 10, 1926.

1,595,448

UNITED STATES PATENT OFFICE.

JOHN B. CALLAHAN, OF JACKSONVILLE, FLORIDA.

FIBROUS PRODUCT.

Application filed November 23, 1922. Serial No. 602,911.

My said invention relates to a fibrous product and to a method and apparatus for making the same. Some of the objects of my invention are to provide a pulp for paper-making and analogous manufactures from a material hitherto unused and also to provide a novel method and novel instrumentalities for preparing the same. It is a matter of common knowledge that the water hyacinth is a plant of such luxuriant growth that it has become a nuisance in the rivers of the Southern States and my invention not only provides efficient means for ridding the navigable waters of this pest but also provides a means and method whereby the plants which have so far served no useful purpose may be made into an industrial material which can be utilized in various ways and for various purposes.

Referring to the accompanying drawings, which are made a part hereof and on which similar reference character indicate similar parts, Figures 1 and 1ᵃ taken together show a plan of my device, while Figures 2 and 2ᵃ taken together show a side elevation thereof.

In the drawings reference character 10 indicates a floating support in the form of a scow on which the machinery of my invention is mounted. This scow may be suitably anchored in a stream or other body of water or tied to the bank thereof. At its forward end the scow is provided with supporting means for a conveyor such means comprising vertical posts 11 and a downwardly inclined support 12 extending from the front end of the scow into the water and inclined supports 13 connected to the upper end of the posts 11 and to the lower end of the supports 12. A lower shaft 14 and an upper shaft 15 extend through the supports 13 and provide supporting means for a pair of chains 16 carrying cross bars 17 to form a sort of double chain conveyor. Each of the cross bars is provided with a number of teeth 18 extending outwardly at right angles thereto and it will be seen that since the hyacinth forms a tangled mass of vegetation at and below the water level the toothed conveyor will catch and drag up such vegetation, the conveyor being preferably arranged so as to pull up the hyacinth by the roots. At each side of the conveyor there is a flat space at 19, 19 on the deck where a man may stand to watch the conveyor and remove snags and stumps from the same before they can damage other parts of the mechanism.

The vegetation carried up by the conveyor passes down a chute 20 underneath a cutter 21 and from thence it passes to a second chute 22 provided with a swinging gate 23 by which the material may be directed into either one of a pair of beaters 24 and 25. These beaters are of the ordinary Hollander type and of small size. The tanks are provided with beater shafts 26 each of such shafts having a pulley 27 adapted to be driven by a belt 28 running at the other end over a wide pulley 29 on the shaft 30. Another pulley 31 on this shaft is connected by a belt 32 to a pulley 33 driving the cutter 21. A shaft 34 extends from the axis of the cutter and by means of sprocket gearing 35 drives the gear 36 on the conveyor shaft 15. The beaters are supplied with water by means of a pipe 37 adapted to discharge into either beater or over the side as required. Water is supplied to the pipe 37 by a centrifugal pump 38 operated by a sprocket chain 39 running over a sprocket gear at one end of the shaft 30.

After the disintegrated material has been thoroughly worked up in the beaters the pulp passes out through valves 40 at the bottom thereof to a stuff chest 41. From this it is discharged by means of stuff pump 42 through a pipe 43 into the bottom of a mixing box 44. From the mixing box it is discharged through a pipe 45 into the vat of the wet machine 46. The pump 42 is actuated by means of a sprocket chain 47 running over a sprocket gear on the shaft 30 and connected at the other end by a train of gearing to a pitman 48 which at its lower end is attached to the pump piston.

Water is supplied to the wet machine 46 by a pipe 49 connected to a second centrifugal pump 50, this pump being operated by a sprocket chain 51 running over a sprocket gear at the other end of the shaft 30.

The wet machine 46 is of the ordinary single press type or a double press machine may be used if desired. The pulp in the machine is taken up by cylinders 52 and 53, carried over by the belt 54 to the table and folded and placed in the press 55 to be made up into bales in the usual manner.

An internal combustion engine 56 drives the shaft 30 by means of a belt 57 passing over pulleys respectively located on the shaft 30 and on the shaft 58. The shaft 58 also carries another pulley driving a belt 59 which drives a shaft 60 by means of a pulley thereon. The shaft 60 is geared to the rollers 61 and drives a felt 54 connected to the wet machine 46. A sprocket chain 63 also passes over a sprocket gear on the shaft 60 and a second sprocket gear on the shaft 64 to drive a paddle wheel for moving the scow from place to place under power. The scow is provided with a rudder 65 for steering the same.

While the mechanism here shown is designed primarily for the purpose of exterminating water hyacinth and turning the plants to a useful end it may also be utilized in connection with other aquatic plants. It will be evident to those skilled in the art that I may vary the form and proportions of my device in numerous ways without departing from the spirit of the invention, therefore I do not limit myself to what is shown in the drawings and described in the specification but only as indicated by the appended claims.

Having thus fully described my said invention, what I claim as new and desire to secure by Letters Patent, is:

1. Self-sized paper made from water hyacinth, substantially as set forth.

2. Self-sized paper containing fibers of water hyacinth, substantially as set forth.

3. A self-sized sheet or web composed of the substance of water hyacinth plants beaten only and formed directly into a sheet or web, substantially as set forth.

In witness whereof, I have hereunto set my hand and seal at Jacksonville, Florida, this 20th day of November, A. D., nineteen hundred and twenty-two.

JOHN B. CALLAHAN. [L. S.]